US007953548B2

(12) United States Patent
Vengroff et al.

(10) Patent No.: US 7,953,548 B2
(45) Date of Patent: May 31, 2011

(54) LOCATION-BASED INFORMATION DETERMINATION

(75) Inventors: Darren E. Vengroff, Seattle, WA (US); Oliver B. Downs, Redmond, WA (US)

(73) Assignee: Pelago, Inc., Seattle, WA (US)

( * ) Notice: Subject to any disclaimer, the term of this patent is extended or adjusted under 35 U.S.C. 154(b) by 598 days.

(21) Appl. No.: 12/082,836

(22) Filed: Apr. 14, 2008

(65) Prior Publication Data

US 2009/0005968 A1    Jan. 1, 2009

Related U.S. Application Data

(60) Provisional application No. 60/911,627, filed on Apr. 13, 2007.

(51) Int. Cl.
*G01C 21/00* (2006.01)
(52) U.S. Cl. ........ 701/202; 701/206; 701/207; 701/300; 340/995.26; 340/995.27
(58) Field of Classification Search .................. 701/200, 701/201, 202, 207, 209, 211, 300, 206; 340/995.26, 340/995.27, 995.28
See application file for complete search history.

(56) References Cited

U.S. PATENT DOCUMENTS

| | | | |
|---|---|---|---|
| 5,771,169 A * | 6/1998 | Wendte | 702/5 |
| 6,262,741 B1 | 7/2001 | Davies | |
| 7,447,508 B1 | 11/2008 | Tendler | |
| 2003/0008619 A1 | 1/2003 | Werner | |
| 2004/0117358 A1 * | 6/2004 | von Kaenel et al. | 707/3 |
| 2004/0139049 A1 | 7/2004 | Hancock et al. | |
| 2005/0102097 A1 | 5/2005 | Tanizaki et al. | |
| 2006/0149774 A1 | 7/2006 | Egnor | |
| 2008/0059889 A1 * | 3/2008 | Parker et al. | 715/748 |

OTHER PUBLICATIONS

Jones, Christopher B., et al., "Proximity Search with a Triangulated Spatial Model," The Computer Journal, vol. 41, No. 2, 1998, pp. 71-83.
McGee, Matt, "10 Likely Elements of Google's Local Search Algorithm," retrieved on Apr. 14, 2008, from http://www.smallbusinessem.com/10-likely-elements-of-googles-local-search-algorithm/519/, 12 pages.
"Help customers find you on Google Maps," retrieved on Apr. 14, 2008, from https://www.google.com/accounts/ServiceLogin?continue=http%3A%2F%2Fwww.google.com%..., 1 page.

(Continued)

*Primary Examiner* — Gertrude Arthur Jeanglaud
(74) *Attorney, Agent, or Firm* — Seed IP Law Group PLLC

(57) ABSTRACT

Techniques are described for determining and providing location-based information, including based on decomposing a geographic area into numerous smaller areas and using one or more layers of polygons to represent various of the smaller areas. In some situations, location-based information for a geographic area is determined efficiently and accurately to reflect actual travel distances and/or times, such as for use in identifying one or more points of interest that are sufficiently proximate to an indicated location (e.g., a current location of a user), and/or to determine actual travel distances and/or times between two or more indicated locations of interest. The location-based information determination may in some situations be performed in a realtime or near-realtime manner after a request is received from a user, such as to interactively provide results to the user that include or are based at least in part on the determined location-based information.

36 Claims, 6 Drawing Sheets
(4 of 6 Drawing Sheet(s) Filed in Color)

OTHER PUBLICATIONS

Google Maps—Florists Loc: 700 Fifth Ave., Seattle, WA, retrieved Apr. 14, 2008, from http://maps.google.com/maps?f=l&hl=en&geocode=&q=florists&near=700+Fifth+Ave.,+Seattle,+WA&jsv=107&sll=47.604828,-122..., 4 pages.
"SEO by the SEA: Internet Marketing and Search Engine Optimization (SEO), Research, Consulting, and Services," retrieved on Apr. 14, 2008, from http://www.seobythesea.com/?p=374, 10 pages.
"Florist in Seattle—YELLOWPAGES.COM," retrieved on Apr. 14, 2008, from http://www.yellowpages.com/Seattle-WA/Florists-?search_mode=all&address=700+Fifth+Avenue..., 4 pages.
"Map of florist in Seattle—YELLOWPAGES.COM," retrieved on Apr. 14, 2008, from http://www.yellowpages.com/Seattle-WA/Florists/city-Seattle?address=700+Fifth+Avenue%2C+..., 1 page.
"Yellow Pages & Online Phone Book," retrieved on Apr. 14, 2008, from http://www.dexknows.com/displayseachmap.ds, 1 page.
"Yellow Pages & Online Phone Book," retrieved on Apr. 14, 2008, from http://www.dexknows.com/search.ds, 2 pages.

* cited by examiner

LOCATION-BASED INFORMATION DETERMINATION

CROSS REFERENCE TO RELATED APPLICATIONS

This application claims the benefit of provisional U.S. Patent Application No. 60/911,627, filed Apr. 13, 2007 and entitled "Location-Based Information Determination," which is hereby incorporated by reference in its entirety.

TECHNICAL FIELD

The following disclosure relates generally to techniques for determining and providing location-based information, such as to efficiently determine location-based information based on actual travel distances and/or actual travel times.

BACKGROUND

People are increasingly using computing devices to access information of a variety of types, including to access information over networks from remote devices and services (e.g., over the Internet and/or private networks, such as communications networks of cellular telephone service providers). One example of information that is often accessed and used includes various types of geographical information, such as maps and driving directions. In addition, many users of computing devices may desire to search for or otherwise locate various types of information in a geographic area near the user, including based on a particular location of the user (e.g., to search for pizza restaurants near my current location)—in some circumstances, such activities may be referred to as "local search" or more generally as location-based information access. In many local search scenarios, user requests are made to find all examples of X within Y miles of a point P. For example, a request may be made by a user to find all Starbucks locations within 5 miles of my current location, or to find all coffee shops open until at least 10 pm within 2 miles of a point P, with the search results ordered by distance from P. Such users may use a variety of types of computing devices when accessing information, including both fixed-location computing devices (e.g., desktop computers) and mobile computing devices (e.g., laptop computers; handheld computers and/or communications devices, including cellular telephones with data communication capabilities; vehicle-based devices; etc.).

The ability of users to receive such location-based information provides a variety of benefits to the users if the information is accurate. However, various problems exist with current techniques for providing such information. As one example, current providers of location-based information typically do not consider any actual travel-related information when providing location-based information. In particular, if a user requests information near a particular origination point location, current providers will typically define and use an 'as-the-crow-flies' circular search radius in the spatial search domain around the origination point of the user. This method produces search results which may be within a specified geographical distance, but to which the actual travel distance may be significantly larger. As an example, consider the case of the Seattle-Bellevue area of the Puget Sound region of Washington State in the United States. The area is divided in the east-west direction by Lake Washington, which has two bridges to cross the lake. Accordingly, a geographic radius-based 'nearest search' query may result in recommendations of "nearest" targets which by actual travel distance are much further than other viable destinations. This phenomenon is illustrated in FIG. 1 via a search for "Toys 'R' Us" retail store locations within ten miles of the origination point 105 (indicated by pushpin 1 in the figure, and labeled as 'Start Point' in the legend 150), and corresponding to a location south of Lake Union in Seattle. In this case, by naive as-the-crow-flies geographic radius search (which typically corresponds to great circle route distances), the Toys 'R' Us store in Bellevue, Wash. (shown on the map 100 as the rectangular brown box 110a with a number 1 and a lower triangle-shaped protrusion, and represented in the legend as the red rectangular box 110b with a number 3) is the closest to the origination point, and in particular is shown as being roughly 6.6 miles away. Conversely, the Toys 'R' Us store in the Northgate area of Seattle (shown on the map as the rectangular brown box 120a with a number 2 and a lower triangle-shaped protrusion, and represented in the legend as the red rectangular box 120b with a number 2) is roughly 6.9 miles away using an as-the-crow-flies geographic distance. However, the actual driving distance to the Toys 'R' Us store in Bellevue from the origination point is roughly 10.8 miles via the limited routes available across Lake Washington (e.g., across the Interstate 90 freeway bridge 130 or the State Highway 520 bridge 140), whereas the Toys 'R' Us store in Northgate is roughly 7.2 miles in actual driving distance from the origination point.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
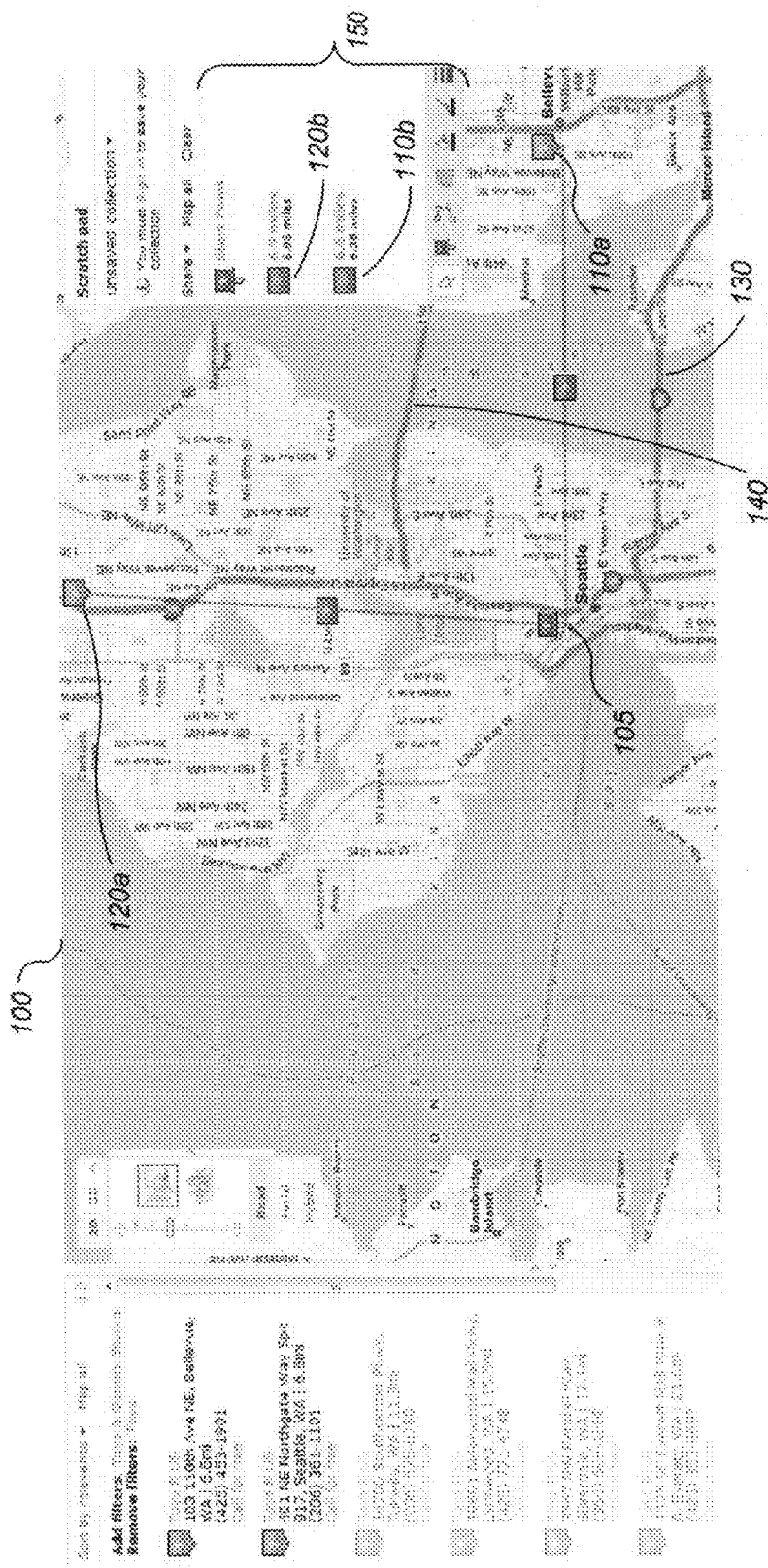
FIG. 1 illustrates an example of naïve radius-based geographic search.

Techniques are described for determining and providing various types of location-based information in various ways. In some embodiments, the techniques are used to efficiently and accurately determine location-based information based on actual travel distances and/or times, including by dynamically generating information about actual travel distances and/or times between numerous locations. Furthermore, in at least some embodiments, the techniques include determining location-based information in an efficient manner by identifying one or more points of interest that are sufficiently proximate to an indicated location (e.g., a current location of a user or other user-specified location) based on actual travel distances and/or times, such as by approximating actual travel distances and/or times to a desired degree of accuracy and/or by determining relative rankings of multiple possible points of interest. The determination of the location-based information may be performed at various times, and in at least some embodiments is performed in a realtime or near-realtime manner after a request is received from a user, such as to interactively provide search results to the user that include or are based at least in part oh the determined location-based information. In at least some embodiments, a location-based information provider system uses the described techniques to generate the information about actual travel distances and/or times between locations and to determine corresponding location-based information, as described in greater detail below.

As discussed in greater detail below, in at least some embodiments the dynamic generating of information about actual travel distances and/or times between locations is performed by decomposing a geographic area into numerous smaller areas, and approximating one or more travel routes between two locations based on inter-relationships between the smaller areas. For example, average distance and/or travel time between two adjacent areas may be known or determined, and then used as part of a total distance or total travel time for a route that passes through the two adjacent areas. In some embodiments, the smaller areas are non-overlapping polygons of similar shape, but the smaller areas may be selected in other manners in other embodiments, including in advance of their use for determining actual travel distances and/or times between locations and/or in a dynamic manner at a time of the determining (e.g., in response to a received request).

For illustrative purposes, some embodiments are described below in which particular types of location-based information for particular geographic areas is determined and used as part of particular scenarios by particular types of users and mobile devices. These examples are provided for illustrative purposes and are simplified for the sake of brevity, and the inventive techniques can be used in a wide variety of other situations, some of which are discussed below.

In some embodiments, when determining an actual distance of a target destination location from an origination point location, one or more routing algorithms may be used to determine an actual distance as may be traveled by a vehicle on one or more roads between the two locations. A variety of types of routing algorithms may be used, including routing algorithms used to determine driving directions between the two locations.

In other embodiments, actual distances between some or all origination and target destination locations may be determined in other manners, including in an approximate manner based on the use of decomposition of a geographic area into smaller areas. For example, in some embodiments, after a search for location-based information is received, approximate radius results of sufficient accuracy are efficiently determined for the search query by subdividing a map of the relevant geographic area into layers of 'somewhat-regular' (such that maximum and minimum diameter of the polygons are within specified criteria, such as to be as similar is possible) local polygons, with information being associated with each edge between polygons to describe the inter-relationship between those polygons (e.g., the connectivity from one polygon to another). Polygons that cannot be directly traveled between (for whatever reason) are given an attribution of zero connectivity on their common edge. Furthermore, as described in greater detail below, a hierarchy of layers of such local polygons with decreasing levels of spatial granularity may be efficiently created and used. Given such a construction of local polygons, arbitrary distance ranges specified for spatial searches may be efficiently determined for arbitrary indicated origination points, such as by identifying all local polygons that fall within that distance range starting from a local polygon that encloses an origination point.

Figure 2A:
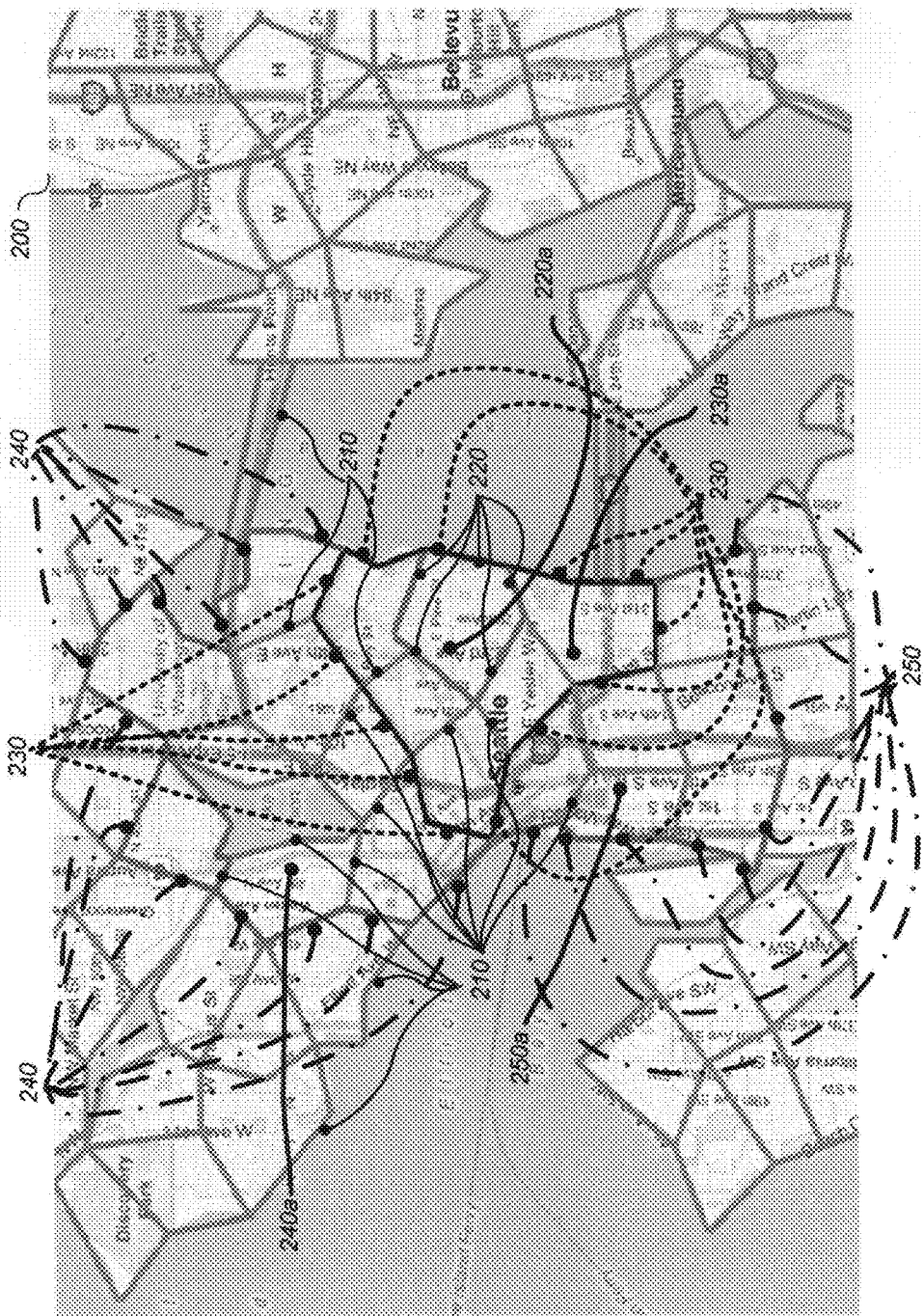
FIGS. 2A and 2B illustrate examples of geographic search using polygon-based information that reflects approximate actual travel distances.

FIG. 2A depicts one example embodiment of a decomposition of the Seattle-Bellevue area into local polygons, which may be used to facilitate determining location-based information of interest as discussed in greater detail below. In the map 200 illustrated in FIG. 2A, most local polygons are shown with blue exterior edges 210 (with only some such edges labeled with reference number 210 for explanatory purposes), and the local polygons may be constructed automatically or at least partially based on human-supplied information and to reflect various types of information about the corresponding subarea to which each of the polygons correspond (e.g., by constructing the various layer 0 lowest player polygons (or "first layer polygons") to be roughly the same size and/or shape, or to correspond to roughly the same travel time, such that a polygon encompassing a high-speed travel route may be shorter than another polygon encompassing a low-speed travel route). Furthermore, while the polygons have a variety of shapes in this example, in other embodiments less, more or other shapes (e.g., circles, ovals, triangles, etc.) may be used. In this example, an origination point for a search has been selected that falls within a particular origination local polygon 220a that is illustrated with red exterior edges 220—this red polygon 220a encompasses the origination point at the most granular level of the indicated polygons, referred to as layer 0 or the first layer. It will be appreciated that larger polygons that encompass the origination point at less granular levels may also be constructed, such as by combining the layer 0 origination local polygon with one or more adjacent polygons, or that smaller polygons at an additionally granular level could be constructed and used. In this example, a polygon 230a at the next level of granularity, layer 1, is illustrated with black exterior edges 230. In this example, the layer 1 black polygon 230a encompasses the red layer 0 origination polygon 220a and all directly connected neighbor adjacent layer 0 polygons to polygon 220a (which includes all neighbor layer 0 polygons in this example except a polygon to the east that corresponds to a portion of Lake Washington, since that east polygon cannot be traveled to from the origination polygon 220a in this example, which is limited to land-based travel). In some embodiments, the layer 1 black polygon 230a may have been previously constructed, such that the same layer 1 black polygon 230a would be used for any of the layer 0 polygons within it, while in other embodiments a layer 1 polygon to be used may instead be dynamically constructed for a particular layer 0 polygon (e.g., by selecting all directly connected nearest neighbor adjacent layer 0 polygons to be part of the layer 1 polygon). In this example, two other example layer 1 polygons 240a and 250a are illustrated that are adjacent non-overlapping neighbors of the black polygon 230a, which are illustrated with green exterior edges 240 and 250, respectively, that are not common with layer 1 polygon 230a, and are roughly to the north and south respectively of the black layer 1 polygon 230a. These additional layer 1 polygons 240a and 250a may be identified in a manner similar to the black layer 1 polygon 230a, such as by selecting one or more central layer 0 polygons and surrounding adjacent neighbor layer 0 polygons, or in other related manners (e.g., by constructing the various layer 1 polygons to be roughly the same size and/or shape, or to correspond to roughly the same travel time, such that a polygon encompassing a high-speed travel route may be shorter than another polygon encompassing a low-speed travel route). While not illustrated here, the three layer 1 polygons 230a, 240a and 250a may form part or all of a higher-level layer 2 polygon.

After the hierarchical layers of polygons are constructed, they may be used to assist in identifying points of interest that are within an approximate proximity of an origination point. For example, with respect to a search whose origination point is within the red layer 0 polygon 220a, the boundary of the red polygon 220a may serve as an approximate boundary for a first distance range (e.g., based on an average diameter of the red polygon 220a, a diameter of a smallest circle that encompasses the exterior of the polygon 220a, a diameter of a largest circle that fits within the interior of the circle, etc.), such that any point of interest within the red polygon 220a boundary is considered to be within the approximate first distance range. Similarly, the boundary of the layer 1 black polygon 230a may serve as an approximate boundary for a second larger distance range, and a boundary of a layer 2 polygon (e.g., the black polygon 230a and two neighboring green polygons 240a and 250a) may serve as an approximate boundary for a third still-larger distance range. In this manner, locations that are within an approximate distance range from an origination point may be quickly determined, by using polygons based on actual travel distances and/or actual travel times.

Figure 2B:
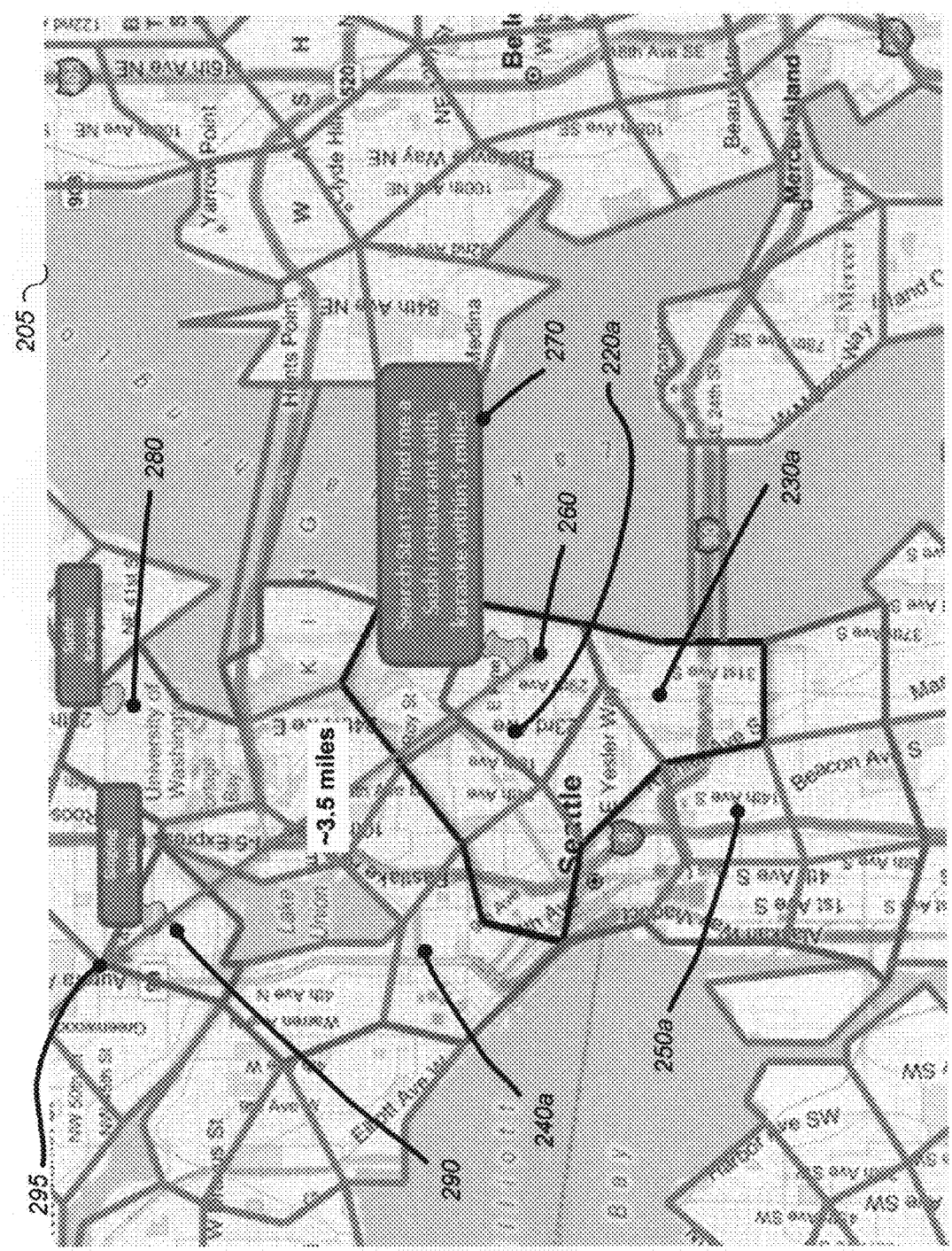

FIG. 2B is similar to FIG. 2A, but includes additional details related to using hierarchical layers of polygons to assist in identifying points of interest within an approximate proximity. In particular, FIG. 2B illustrates an example origination point 260 within the red layer 0 polygon 220a, corresponding to the location of an example user who has initiated an example search 270 of "find me a sushi restaurant with karaoke within 5 miles." In response, an embodiment of a location-based information provider system may receive the search query, identify one or more appropriate points of interest, and provide information about one or more of the identified points of interest as search results. In this example, a pre-constructed hierarchy of polygons may be used, such that the location-based information provider system has previously stored information about average radiuses (or other size-based measurements) for various polygons (e.g., ~0.5 miles for the red layer 0 polygon 220a, ~1.5 miles for the black layer 1 polygon 230a, ~3 miles for a layer 2 polygon that includes the black layer 1 polygon 230a and two green layer 1 polygons 240a and 250a, etc.). Accordingly, the location-based information provider system may immediately automatically determine that all sushi restaurants within the layer 2 polygon (with a ~3.5 mile radius) are at least approximately within the 5-mile user-specified proximity of interest, and may further consider all sushi restaurants within a higher-level layer 3 polygon (not shown, having an approximate radius of, for example, 6 miles) as being approximately within the 5-mile user-specified proximity of interest, such as depending on whether the identified search results are preferred or required to be over-inclusive (e.g., to prefer to include all search results that are within the 5-mile limit, even if some search results slightly farther than the 5-mile limit may be included, such as to use the higher-level layer 3 polygon) or under-inclusive (e.g., to prefer to include only search results that are within the 5-mile limit, even if some search results that are only slightly within the 5-mile limit may be excluded, such as to use the layer 2 polygon). In other embodiments, multiple layer 2 and/or lower layer polygons (e.g., layer 1 and/or layer 0 polygons) may be selected so as to cover the indicated search area as closely as possible, such as at the expense of additional processing time to identify those multiple polygons. In this example, the identified points of interest include a "Sushi Karaoke" restaurant 280 near the University of Washington and a "Singing Sushi" restaurant 290 north of Lake Union, both being within the upper green layer 1 polygon 240a to the north of the black layer 1 polygon 230a.

Furthermore, in this example, a distance from the origination point 260 to a northwest corner 295 of the upper green layer 1 polygon 240a (near the "Singing Sushi" restaurant) is shown for illustrative purposes, although such information may not be displayed to a user. In particular, in this example, the line illustrates that an approximate straight-line as-the-crow-flies distance between the origination point 260 and the edge of the layer 2 polygon may be estimated to be 3.5 miles, based on approximately 3.5 miles being the average radius of the layer 2 polygon. However, since the actual travel distance to this point (and the nearby "Singing Sushi" restaurant 290) is significantly longer, and in particular in this example includes traveling around Lake Union, the actual travel distance to the "Singing Sushi" restaurant 290 from the origination point 260 may be significantly longer than 3 miles. For example, in some embodiments, actual travel distances between points may be approximately determined by counting the layer 0 polygons traveled through between the points (using inter-polygon connectivity information to determine the sequence of layer 0 polygons along the travel path), such as if the layer 0 polygons have similar sizes and/or shapes. In this example, the "Sushi Karaoke" restaurant 280 is 3 connected polygons away from the origination point 260, while the "Singing Sushi" restaurant 290 (obscured by Lake Union) is accessed by traversing at least 4 connected polygons. Thus, the "Sushi Karaoke" restaurant 280 may be ranked as the approximately closest result. Accordingly, the search results provided to the user may include one or both of the two example sushi restaurants 280 and 290 (e.g., provided in text form and/or as part of a map such as the map 205 illustrated in FIG. 2B), and may further in some embodiments include information about approximate actual travel distance and/or actual travel time. Alternatively, in other embodiments, rather than counting layer 0 polygons, the techniques may instead include aggregating actual travel distances (or values for other types of travel measurements) associated with each of the polygons in a sequence between the points (e.g., a shortest sequence based on number of polygons and/or on the aggregated actual travel measurement values for the polygons).

A formal description of one embodiment of polygon decomposition and hierarchical multi-layer polygon construction is as follows. Let us refer to a polygon, i, at zoom-level, z; (z,i), with $z \in [0,Z]$, where Z is the least granular layer of polygons, and $0 \leq i < N_z$, where $N_z$ is the number of polygons in level Z, typically with $N_z \geq N_{z+1}$. For each layer of polygons, an adjacency list or matrix $A_{i,j}^{(z)}$ can be computed describing the connectivity of polygon i with polygon j in layer z.

In at least some embodiments, the base layer z=0 comprises an arbitrary 'somewhat regular' polygonal decomposition of the land-masses of the local geography, including spanning structures (such as bridges and tunnels), such as by using (for example) City Blocks, Zip Code, County, etc. as a basis for the polygon creation. The size of the local polygons of the base layer may vary in various embodiments, and the precision in resulting distance determinations is limited by the size and regularity of the polygons in this most granular layer.

Having laid out the base layer of polygons, a hierarchy of successively higher-order layers of tessellating polygons may be created by aggregation of successive orders of neighboring adjacent polygons (black and green layer 1 polygons 230a, 240a and 250a in FIGS. 2A and 2B).

Given the hierarchy of networks of polygons for a region, a query of the form 'search for the nearest Point of Interest (POI) to origination location Y within R miles that satisfies criteria X' begins by selecting an appropriate layer of polygons, z, to use for the search, such that the local polygon containing Y in layer z+1 is the smallest polygon with diameter greater than the search radius, R;

$Y \in (z,i)$ such that $\operatorname{argmin}_z |(z+1,i)| \geq R$

In one particular embodiment, the following algorithm may be used to determine the appropriate layer z of polygons;

```
for (z=0; z<maxZ; z++) {
    if( diameter(Polygon(z+1,centerY)) > search_radius)
        return z;
}
```

As previously noted, in some embodiments, the search radius R may reflect measures other than solely actual travel distance, such as travel time (whether instead of or in addition to actual travel distance). Moreover, a variety of types of information may be considered when determining actual travel distance and/or travel time, such as a particular travel mode (or "travel type") (e.g., automobile versus public bus or other transit versus bicycle versus travel by foot, etc.), a particular time (e.g., one or more of time-of-day, day-of-week, day-of-month, etc.) of travel (e.g., to reflect different traffic conditions at different times), particular conditions at a time of travel (e.g., current weather), etc. Moreover, in some embodiments, a single geographical area may have multiple different polygon base layers and/or hierarchies of higher-order polygon layers, such as to reflect different types of inter-polygon connectivity based on different travel modes, different times (e.g., to reflect different transit schedules; to reflect different road characteristics, such as different restrictions or physical availability; etc.), different weather conditions, etc. Furthermore, in some embodiments, a single hierarchy may have alternative groups of polygons for one or more layers, such as to construct multiple alternative groups of layer 1 polygons that overlap each other, such that when selecting a particular layer 1 polygon to represent a particular location in a geographic area, multiple layer 1 polygons may include that location and be available to represent information about that location (e.g., to allow a layer 1 polygon to be selected for which the location of interest is as close to the center of the selected layer 1 polygon as possible, to allow a layer 1 polygon to be selected for which the location of interest is as close to one or more edges of the selected layer 1 polygon as possible, etc.).

In some embodiments, the search radius, R, may not be specified, in which case 'as-the-crow-flies' radius search may initially be performed, and then the search results ordered and/or omitted by proximity using a selected layer of polygons, z, such that the diameter of the local polygon in layer z+1 exceeds the 'as-the-crow-flies' distance to the nearest search result.

After an appropriate polygon layer is selected for a query, the set of potential search results is determined by identifying POIs that are located within the polygon at the selected layer that encompasses the origination point and that meet any specified criteria, X. In some embodiments, identification of such POIs may be facilitated by maintaining a database of POI information that associates each POI with information that allows the polygons encompassing the POI to be readily identified (e.g., for each POI, listing a unique identifier for each encompassing polygon and/or listing geographical location information that may be matched to geographic regions of the polygons), as well as with information about characteristics of the POIs that may be specified in the search results. The results set can then be ordered by proximity using a finer spatial resolution as follows;

Drop to the polygon layer max(z−k, 0), for some constant k, implying a spatial granularity $O(|z|^{-2k})$.

Using the (pre-computed) adjacency matrix $A_{i,j}^{(z-k)}$, order the POIs by the number of connected polygons crossed between the polygon in layer z−k containing origination point Y and the polygon containing each POI result.

The number of polygons or, in some embodiments the sum of diameters of each polygon traversed, or in some embodiments a pre-computed distance matrix indicating distances between pairs of neighbors of a traversed polygon, can then be used to provide the approximate distance between Y and the POI.

In some embodiments, the regularity and spatial granularity of the polygon decomposition may be refined and optimized using techniques including, but not limited to, the following methods;

1. Local polygon analysis at the time the base polygon layer in being constructed—regularity of a polygon can be tested at the time it is constructed, and underlying geographic information (e.g., City Blocks, Zip Codes, etc.) may be used to improve the regularity of each polygon.
2. Use of a data-driven methodology, such as either synthetic search queries (for example searches generated from a distribution of locations {Y} surrounding each POI in the database) or logs of actual user queries, to compare distance estimates from this approach with actual distances from the location to the POI. Polygons containing POIs subject to significant disparities between the estimated and actual distance would be flagged for review of the local polygon decomposition. Areas flagged for review would then be reconstructed, either manually or by an optimization algorithm designed to produce polygons minimizing the error between estimated and actual distances of the queries. In various embodiments, the optimization algorithm would optimize for sum of squared errors or other error-measurement methods.

Furthermore, the described polygon decomposition techniques may be used to assist in the assignment of map database POI and address geocode to a labeled observation of a location based on GPS or some other location measurement technology. In general, one may have multiple un-geocoded measurements of a location, describing its shape (plus noise associated with the measurement methodology); we term this the Local Spatial Model (LSM) of the location. The LSM of a location allows a generally irregular radius for a location to be described, and as a result, irregular search criteria may be used for lookup of the nearest corresponding POI(s) in base map data. However, irregular spatial queries are computationally expensive, and location-based service APIs typically facilitate only radius-based search. Nonetheless, the nearest POI to an origination location may be efficiently looked up using the irregularity of the POI location as described by the LSM, using the polygonal decomposition of an area at a high spatial granularity to model irregularity in the location shape and hence allow an irregular search radius (albeit confined to the granularity and base-shape of the polygons). To populate the polygons with membership of a location, a Monte Carlo sample of points from the LSM is made with each polygon containing a sample point receiving the attribution of membership of the location. Since for radius-based search the polygon hierarchy can be populated with the POIs contained within them, then POIs can be linked to location (LSM) by common attribution of a polygon. In addition, multiple matches can be ranked by likelihood by computing the probability mass of the LSM for the location in the polygons containing the POIs, as is illustrated in FIG. 3.

Figure 3:
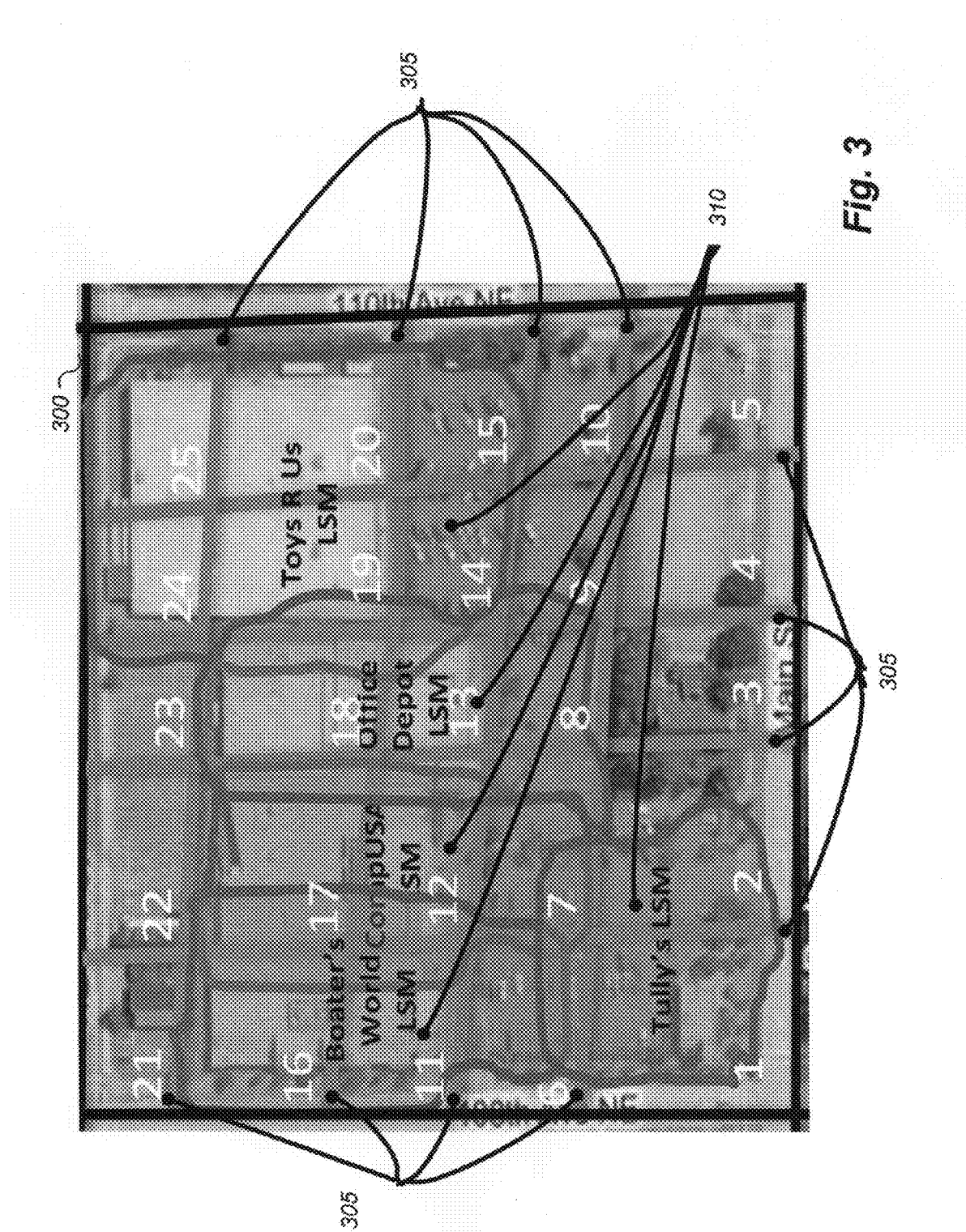
FIG. 3 illustrates an example of identifying polygon-based information for a location visited by users.

In particular, the geographic area 300 illustrated in FIG. 3 is divided into polygons at the street block-level (in black, with a single square block illustrated in this example), and subdivided into 25 numbered smaller polygons with red edges 305. Overlaid in translucent blue are the LSMs 310 for each of 5 businesses in the block, which in this example are Toys 'R' Us, Office Depot, CompUSA, Boater's World and Tully's. In a case where POI geocodes are sufficiently accurate that each POI is geocoded sufficiently close to its physical location, a lookup relationship between LSM and POI might be as follows;

TABLE 1

| POI | Actual Location Polygon IDs | LSM Polygon IDs |
| --- | --- | --- |
| Tully's | 1 | 1, 2, 6, 7 |
| Boater's World | 11, 16 | 6, 7, 11, 12, 16, 17 |
| CompUSA | 12, 17 | 6, 7, 11, 12, 16, 17 |
| OfficeDepot | 13, 18 | 7, 8, 9, 12, 13, 14, 17, 18, 19 |
| Toys R Us | 19, 20, 24, 25 | 13, 14, 15, 18, 19, 20, 23, 24, 25 |

In other embodiments, the address geocodes for Tully's, Boater's World, CompUSA and Office Depot may not be contained within polygons common to those containing the LSM of the location, for example they may each be at the lower left corner of polygon 1 (each has the same address, that being 100 100th Ave NE, Bellevue, Wash.), while Toys 'R' Us (with address 103 110th Ave NE, Bellevue, Wash.) may be geocoded to the lower right corner of polygon 5. In such a case, the self reports of users labeling the LSM with the name of the physical location to which it corresponds may be used in combination with a 'nearest' named POI search to identify the POI and assign a more appropriate Polygon ID and hence geocode. For example, an LSM may be used to help generate a set of nearest named POIs in a map database (e.g., in this example, using some or all of "Tully's," "Boater's World," "CompUSA," "Office Depot" and "Toys 'R' Us" for one of the LSMs in the black block-level polygon) as candidates for the name of the location that corresponds to the LSM, which can then be refined by taking input from the users of mobile location-enabled devices whose locations are being tracked about which POIs they actually visited from a short list of candidates—this provides us a 'self-reported' label against which assignments of LSMs to actual POI names may be determined.

Figure 4:
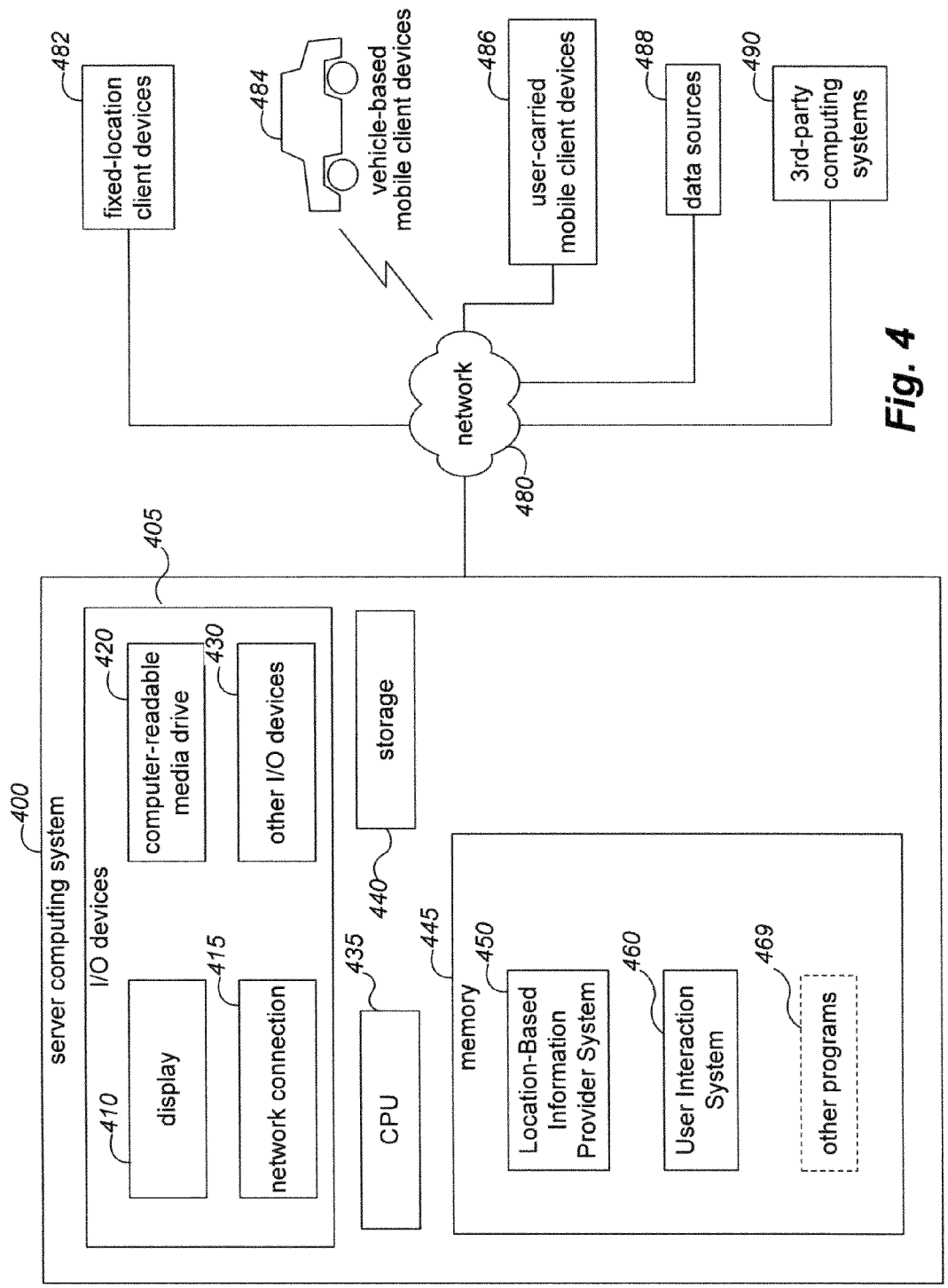
FIG. 4 is a block diagram illustrating a computing system suitable for executing an embodiment of a system that performs at least some of the described techniques.

FIG. 4 is a block diagram illustrating an embodiment of a computing system 400 that is suitable for performing at least some of the described techniques, such as by executing an embodiment of a Location-Based Information Provider system 450. The computing system 400 includes a central processing unit ("CPU") 435, various input/output ("I/O") components 405, storage 440, and memory 445, with the illustrated I/O components including a display 410, a network connection 415, a computer-readable media drive 420, and other I/O devices 430 (e.g., keyboards, mice or other pointing devices, microphones, speakers, etc.).

In the illustrated embodiment, an embodiment of the Location-Based Information Provider system 450 executes in memory 445 in order to perform at least some of the described techniques, such as to determine location-based information based on actual travel distances and/or times using the previously described polygon decomposition techniques. In addition, in this example a User Interaction system 460 and one or more optional other programs 469 also execute in memory 445. The computing system 400 and its executing systems may communicate with other computing systems via a network 480 (e.g., the Internet, one or more cellular telephone networks, etc.), such as various fixed-location client devices 482, vehicle-based mobile clients 484, user-carried mobile client devices 486, data sources 488, and third-party computing systems 490.

In particular, in this example embodiment, users of the various clients and/or third-party computing systems may supply requests for location-based information, such as by supplying requests for local search information. In this example embodiment, the received requests are received by the User Interaction system 460 (e.g., a system that provides local search capabilities), which interacts with the Location-Based Information Provider system 450 to obtain appropriate results for the requests, and then returns the results to the requesters as appropriate. In other embodiments, the Location-Based Information Provider system 450 may instead directly interact with users or other requesters in at least some situations.

The Location-Based Information Provider system determines and provides location-based information in response to requests, such as to determine location-based information for POIs that are within a specified actual travel distance and/or actual travel time of an indicated origination point. In particular, the Location-Based Information Provider system 450 obtains various information regarding geographic areas and points of interest, such as from data sources 488 and/or from storage 440 (e.g., from a POI database on storage, not shown). In some embodiments, the system 450 may automatically determine layer 0 polygons and a corresponding hierarchy of higher-order polygons for each of one or more geographic areas before beginning to provide location-based information, while in other embodiments will receive and use such polygon and/or adjacency matrix information from an external source (e.g., based on manual construction or specification). After the various underlying information about geographic locations and POIs is available to the system 450, the system may determine location-based information for requests as previously described, such as by using polygon decomposition. In at least some embodiments, the system 450 performs its determination of location-based information in a substantially realtime or near-realtime manner, such as within a few milliseconds or a few seconds of receiving a request for the information.

While not illustrated here, other systems (e.g., systems provided by other programs 469) may obtain determined location-based information from the systems 450 and/or 460 and use the obtained information in manners other than display to users. In addition, while not illustrated here, a POI Assignment system (e.g., a system provided by one of the other programs 469) may use polygon decomposition techniques to assign a location-based observation (e.g., an observation of a user or device, such as via GPS-based location information or other location measurement) to a POI and/or LSM, as discussed in greater detail elsewhere.

The various client devices 482, 484 and 486 may take various forms in various embodiments, and may generally include any communication devices and other computing devices capable of making requests to and/or receiving information from the systems 450 or 460. For example, the vehicle-based clients 484 in this example may each be a computing system and/or communication system located within a vehicle that receives data from systems 450 and/or 460. In some cases, the client devices may execute interactive console applications (e.g., Web browsers) that users may utilize to make requests, while in other cases at least some such location-based information may be automatically sent to the client devices (e.g., as text messages, new Web pages, specialized program data updates, etc.) from one or more of the systems 450 and 460.

The data sources 488 may include a variety of types of sources of data that may be utilized by the system 450, including map services and/or databases that provide information regarding road networks, such as the connectivity of various roads to one another as well as traffic control information related to such roads (e.g., the existence and location of traffic control signals and/or speed zones). Other data sources may also include sources of information about events and/or conditions that impact and/or reflect traffic conditions.

The third-party computing systems 490 include one or more optional computing systems that are operated by parties other than the operator(s) of the systems 450 and/or 460, such as parties who receive location-based data from one or more of the systems 450 and/or 460 and who make use of the data in some manner.

It will be appreciated that the illustrated computing systems are merely illustrative and are not intended to limit the scope of the present invention. Computing system 400 may be connected to other devices that are not illustrated, including through one or more networks such as the Internet or via the Web. More generally, a "client" or "server" computing system or device may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated systems may in some embodiments be distributed in various components (not shown), and the functionality of the illustrated systems may not be provided and/or other additional functionality may be available.

In addition, while various items are illustrated as being stored in memory or on storage while being used, these items or portions of them can be transferred between memory and other storage devices for purposes of memory management and/or data integrity. Alternatively, in other embodiments some or all of the software components and/or systems may execute in memory on another device and communicate with the illustrated computing system via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components and/or data structures may also be stored (e.g., as software instructions or structured data) on a computer-readable medium, such as a hard disk, a memory, a network, or a portable media article to be read by an appropriate drive or via an appropriate connection. The systems, components and data structures can also be transmitted as stored generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 5:
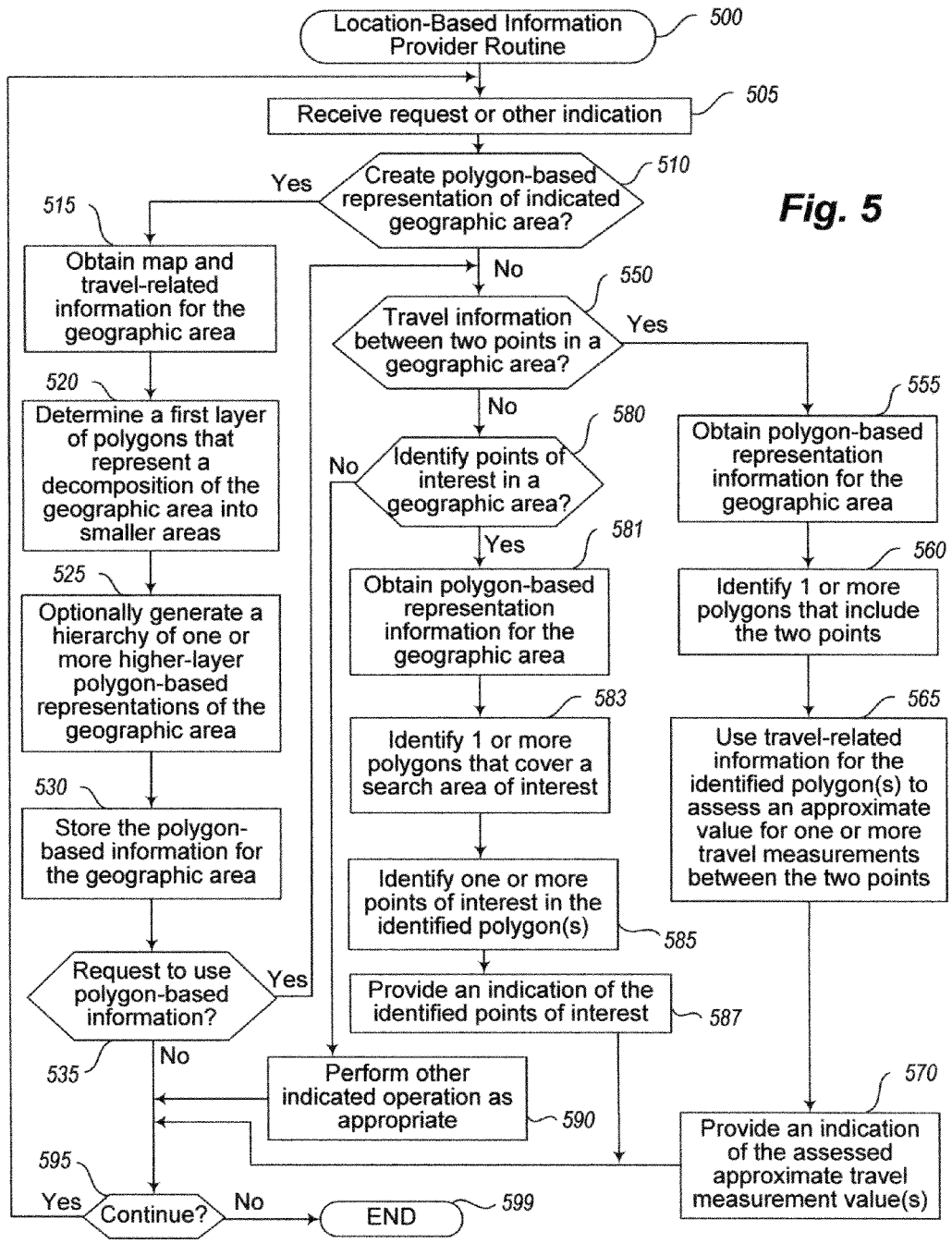
FIG. 5 is a flow diagram of an example embodiment of a Location-Based Information Provider routine.

FIG. 5 is a flow diagram of an example embodiment of a Location-Based Information Provider routine 500. The routine may be provided by, for example, execution of an embodiment of the Location-Based Information Provider system 450 of FIG. 4 and/or as otherwise described herein, such as to facilitate determining location-related information in geographic areas in an efficient manner based on the use of a polygon-based decomposition that represents various information about smaller areas of the geographic areas. In this illustrated embodiment, a single system and routine determines polygon-based information for geographic areas and uses such polygon-based information to facilitate determining location-related information in the geographic areas, but in other embodiments two or more distinct systems and routines may perform such functionality (e.g., distinct systems that are remote from each other and/or are operated by unrelated or otherwise distinct entities), such as if one system determines polygon-based information for geographic areas and one or more other systems use that polygon-based information to facilitate determining location-related information in the geographic areas.

In this example embodiment, the routine begins at block 505, where a request or other indication is received by the routine, such as from a user, from another executing system, etc. The routine then continues to block 510 to determine whether the request or other indication is related to creating polygon-based information to represent an indicated geographic area. If so, the routine continues to block 515 to obtain map information and other travel-related information for the geographic area, such as based on receiving that information in block 505 and/or by dynamically retrieving such information from one or more remote or local sources (e.g., from a distinct entity that provides such information to others, such as for a fee). As discussed in greater detail elsewhere, the map and other travel-related information may have various forms, such as to indicate some or all roads (e.g., for all roads, for major travel routes, etc.) or other mechanisms of travel in the geographic area (e.g., for other travel types or modes, such as train tracks and train stations, bus routes and bus stations, bicycle paths, ferry routes and ferry stations, etc.). The map and other travel-related information may further include various distance-related information (a scale for a map, distances associated with particular road segments or between other points, etc.), as well as various other types of travel-related information (e.g., average travel speeds along particular routes, such as at particular times; average travel times between particular locations in the geographic area, such as at particular times; information about travel modes allowed on particular routes, such as whether vehicles or bicycles or foot traffic are allowed along particular roads; etc.). In addition, in some embodiments, the map and other travel-related information may further include information about various points of interest in the geographic area, such as to indicate locations within the geographic area at which the points of interest are located and/or to indicate various other types of information about such points of interest that may be of interest or use to people searching for, browsing for, or otherwise obtaining information about such points of interest (e.g., information about categories or types of the points of interest, hours of operation, etc.).

After the various map and other travel-related information is obtained, the routine continues to block 520 to determine a first layer of layer 0 polygons with which to decompose the geographical area into smaller areas, such that the first layer polygons constitute a representation of the geographical area at a most granular level to be used. As discussed in greater detail elsewhere, the determination of a layer of polygons such as the first layer may be performed in various manners in various embodiments, such as to be supplied in whole or in part by one or more manual operators, or instead to be automatically generated by the routine. In addition, in some embodiments and situations, some portions of the geographic area may not be represented with any polygons (or instead one, potentially large and unusually shaped polygon), such as to represent portions of the geographic area in which travel of one or more travel types is not available. For example, a lake or other body of water may be represented as a single polygon without travel connectivity to adjacent polygons if the travel types of interest do not include boat-related travel, although a bridge or ferry over the lake may in some such embodiments be represented with one or more other polygons that do have travel connectivity to polygons representing land at the ends of the bridge or at the ferry stations. Furthermore, the size and shape of the first layer polygons may be determined in various ways in various embodiments, such as to have all of the polygons be a similar shape and/or size (e.g., of a size that is as small as or smaller than the finest level of granularity of interest for this geographic area); varying sizes and/or shapes to reflect a particular type of travel measurement of interest, such as travel time (e.g., such that each polygon represents an approximately equal amount of travel time in one or more directions); etc.

In addition, in at least some embodiments and situations, polygons may each have one or more associated travel measurement values that correspond to actual travel through a geographic area subarea to which that polygon corresponds, such as one or more distance-related measurements (e.g., to correspond to a single average actual travel distance for the polygon, to include average or other actual travel distance in multiple distinct directions, etc.), one or more measurements related to travel time for the polygon (e.g., a single average actual travel time corresponding to travel through the polygon, or multiple distinct average actual travel times to correspond to travel through the polygon in different directions), etc. Furthermore, while in some embodiments a single first layer of polygons will be determined, in other embodiments multiple first layers of polygons may be generated, such as to be used as alternatives with each distinct first layer of polygons corresponding to a different travel mode and/or travel conditions (e.g., time of travel, weather conditions, etc.). Thus, for example, if information related to actual travel time is of interest, a first layer of polygons may be generated to represent travel times for travel by one or more types of vehicles, and another first layer of polygons may be generated to represent travel times for travel by foot. In addition, in at least some embodiments, various information is associated with the polygons of the determined first layer, including information about connectivity between adjacent polygons that reflects whether or not travel of an indicated type is allowed between the polygons. Thus, for example, it may be of interest to determine whether vehicles are able to travel directly between two adjacent polygons and/or whether foot traffic is possible directly between two adjacent polygons—if so, different first layers of polygons may be created to correspond to those different travel modes so that the generated travel connectivity information for a particular first layer of polygons is consistent with a particular travel mode of interest, while in other embodiments, a single first layer of polygons may be created and information about travel connectivity or other types of travel-related information may be separately stored for multiple travel modes and/or multiple other travel-related factors of interest. Furthermore, if travel through a polygon is limited to a single direction or is otherwise limited in one or more manners, such information may similarly be stored with the polygon and used for determination of travel routes and associated travel times.

After block 520, the routine continues to block 525 to optionally generate one or more higher-layer polygon representations of the geographic area, such as to be part of a hierarchy of multiple polygon layers. In some embodiments, as discussed in greater detail elsewhere, each layer of polygons may be generated based at least in part on polygons of a next-lower level of the hierarchy, such as to generate a second layer of polygons based on the previously generated first layer of polygons. For example, a particular second layer polygon may include one or more first layer polygons, such that the second layer polygons may each be generated so as to represent a larger travel-related measurement corresponding to the geographic area than that of the most-granular travel-related measurements of the first layer polygons (e.g., to construct a second layer polygon based on a fixed number of similarly sized first layer polygons, such that each second layer polygon has a size that corresponds to a multiple of the first layer polygons; to construct each second layer polygon to reflect an approximate average travel time, such as by combining sufficient first layer polygons in each second layer polygon to correspond to that approximate average travel time; etc.). As with the polygons of the first layer, in some embodiments the second and higher-layer polygons are automatically generated (regardless of whether the first layer polygons were manually or automatically generated), while in other embodiments some or all of the polygons of one or more layers other than the first layer are generated based at least in part on manually supplied information from one or more humans (e.g., to allow human modification of an automatically generated layer of polygons). As with the polygons of the first layer, the polygons of the second and higher layers may each have one or more types of associated travel-related information, such as by aggregating corresponding information associated with the first layer polygons (e.g., average distance, travel time, or other travel-related measurements; travel connectivity between adjacent or otherwise nearby polygons; etc.), or may instead be automatically determined in other ways (e.g., such as by obtaining information from one or more remote sources of travel-related information for the geographic area).

After block 525, the routine continues to block 530 to store the generated polygon information for the geographic area, such as for later use. The routine then continues to block 535 to determine whether the request or other indication received in block 505 was part of a request to use polygon information for the geographic area for one or more purposes at this time. If so, or if it was instead determined in block 510 that the received request or other indication was not to create polygons, the routine continues to block 550 to determine whether the request or other indication received in block 505 was to provide travel-related information between two or more indicated points or other locations in a geographic area. If so, the routine continues to block 555 to obtain polygon-based decomposition information for the geographic area, such as information previously generated with respect to blocks 515-530, or instead in other embodiments from one or more remote sources.

The routine then continues to block 560 to identify one or more polygons from the obtained information that include the two indicated locations of interest, and in block 565 uses travel-related information associated with the identified one or more polygons to assess an approximate value for one or more measurements of travel between the two indicated locations (e.g., for one or more travel measurement types indicated by the requester; for one or more travel measurements types that are automatically selected by the routine, such as default travel measurement types and/or travel measurement types based on the indicated locations; etc.). While not illustrated here, in other embodiments, more than two locations may be indicated and/or the two or more locations may be in two or more distinct geographic areas, such as are represented by two or more distinct polygon-based decompositions. In at least some such embodiments, the respective information from those two or more polygon-based representations may be combined to satisfy the request, such as if the geographic areas are adjacent or if information about travel between the two geographic areas is available (e.g., distances, travel times, etc.).

Furthermore, the one or more polygons that include the two locations may be determined in various ways in various embodiments. For example, as discussed in greater detail elsewhere, in some embodiments the routine will begin with the most granular layer of polygons and continue to successively higher and less granular polygon layers until a single polygon is identified that includes the two or more locations of interest. If so, that single polygon may be used to approximate various types of travel-related information between the two or more locations, such as an approximate average actual travel distance between the two locations based on an average travel distance for the polygon (e.g., an average radius or average diameter of the polygon), an approximate actual travel time between the two or more locations based on one or more travel times associated with the single polygon (e.g., an average actual travel time to cross through the geographic area subarea for the polygon, half of such an average actual travel time for the polygon, etc.). In other embodiments, the selection of one or more polygons may include selecting one first layer polygon that includes a starting point corresponding to one of the two or more locations and selecting another first layer polygon that includes an ending point corresponding to another of the two or more locations, determining a shortest path or other sequence of one or more polygons for a travel route between the starting and ending points (considering any travel connectivity information between polygons), and determining one or more travel-related measurement values that correspond to that travel route (e.g., approximate travel distance, approximate travel time, etc.). Furthermore, in at least some such situations, polygons at different layers may be used to represent travel-related measurement values at different levels of granularity, such as with a sequence of multiple first layer polygons providing more accurate travel-related measurement values than using travel-related measurement values associated with a single higher-layer polygon that encompasses all of the points of interest, but may further involve additional processing time to determine the more granular and accurate travel-related measurement values. Thus, in at least some embodiments and situations, the routine 500 may make tradeoffs between accuracy and efficiency in at least some situations (e.g., to reflect a desired time of response to the received request), such as based on default operations of the routine; based on an instruction from a user that initiated the request; and/or as automatically determined by the routine, such as based on current operating characteristics (e.g., a current level of under-utilization or over-utilization, an amount of a fee provided by the requester for the information, etc.). Furthermore, in at least some embodiments, travel-related measurement values that are obtained from use of a polygon-based decomposition may be adjusted to reflect current or other indicated conditions, such as time-of-day, weather, current levels of traffic congestion, etc.

After the one or more travel-related measurement values are determined in block 565, the routine continues to block 570 to provide an indication to the requester of the assessed approximate travel-related measurement values. In addition, in some embodiments, at least some such approximate travel-related measurement values may be cached or otherwise stored for possible later use, such as to respond to requests from one or more other users or other requesters. As one example, if travel-related measurement values are requested between two points of interest that are of a type that are likely to be requested again (e.g., based on a category or type of one or more of the points of interest; based on a current topical nature related to one or more points of interest, such as to correspond to a major event that is currently occurring or will occur in the near future; etc.), such information may be stored. In other embodiments, all or none of the approximate travel-related measurement values between two or more points may be stored for later use.

If it is instead determined in block 550 that the request or other indication in block 505 is not related to travel information between two points, the routine continues instead to block 580 to determine whether the request or other indication is related to identifying one or more points of interest in a geographic area, such as within an indicated search radius of an indicated starting point, or instead to cover one or more other indicated sub-areas of the geographic area. If so, the routine continues to block 581 to obtain polygon-based decomposition information for the geographic area, such as in a manner similar to that previously described with respect to block 555. The routine then continues to block 583 to identify one or more polygons that have associated travel-related information for a search area of interest, such as based on a starting point and indicated search radius. As described with respect to blocks 560 and 565, the identification of one or more such polygons may be made in various manners in various embodiments, such as to identify a single polygon at the lowest layer possible that includes all of the search area, or to instead start at a lowest layer polygon that includes an indicated starting point and to move outward from that starting polygon in one or more (e.g., all) directions until an aggregation of the starting polygon and other polygons cover the search area of interest. After the one or more polygons of interest have been identified, the routine continues to block 585 to identify one or more points of interest in the identified polygons, such as points of interest that have one or more characteristics or attributes indicated as part of the search request or other request for information about points of interest. As discussed in greater detail elsewhere, information about various types of points of interest may be obtained in various ways. After block 585, the routine continues to block 587 to provide an indication of the identified points of interest to the requester.

If it is instead determined in block 580 that the request or other indication received in block 505 is not to identify points of interest in a geographic area, the routine continues instead to block 590 to perform one or more other indicated operations as appropriate. The other types of indicated operations may have various forms in various embodiments, including the following non-exclusive list: to receive and store information about maps and other travel-related information for one or more geographic areas, such as for later use in generating polygon-based decompositions of those geographic areas; receiving information about current conditions that affect travel in one or more geographic areas, such as for use in adjusting previously determined approximate average travel-related measurement values; to perform monitoring and possible updating of previously generated polygon-based decompositions of one or more geographic areas, such as to receive information about actual travel-related measurement values and to compare those actual values to approximate values from a previously generated polygon-based decomposition (e.g., so as to update data associated with particular polygons to reflect actual values, to generate new a polygon-based decomposition to represent the geographic area in a manner that better reflects actual travel patterns, etc.); to receive a request for generated and stored polygon-based decomposition information, such as one or all of the polygons that are used to represent a particular geographic area or sub-area (e.g., from a remote requester via an API of the Location-Based Information Provider system, such as in exchange for a fee); to perform various housekeeping operations; etc.

After blocks 570, 587, or 590, or if it is instead determined in block 535 that a request to use the polygon information was not received, the routine continues instead to block 595 to determine whether to continue. If so, the routine returns to block 505, and if not continues to block 599 and ends.

While in some embodiments the request or other indication received in block 505 may be from a user, such as to obtain location-based search results or other location-based information for a current location of the user or other indicated location of interest, in other embodiments some or all of the requests or other indications may instead be received by other systems, such as for use by those systems in providing information to users (e.g., requests from other third-party systems via an API of the Location-Based Information Provider system, such as for a fee for providing that information).

Those skilled in the art will appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention may be now or later presented in certain claim forms, the inventors contemplate the various aspects of the invention in any available claim form. For example, while only some aspects of the invention may be initially recited as being embodied in a computer-readable medium, other aspects may likewise be so embodied.

What is claimed is:

1. A method for a computing system to determine location-related information for points of interest, the method comprising:

obtaining map information for a geographic area of interest;

determining polygon-based information for the geographic area that represents actual travel distances in the geographic area by, decomposing the geographic area into a plurality of smaller areas based at least in part on the obtained map information, the smaller areas represented with a first polygon layer that includes a plurality of non-overlapping adjacent polygons of substantially similar size, and determining an associated approximate actual travel distance in the geographic area that the polygons of the first polygon layer each represent based on an average diameter of the polygons of the first polygon layer; and automatically generating a hierarchy of polygon layers that includes the first polygon layer as a lowest level of the hierarchy and that includes one or more additional polygon layers for the geographic area that are successively higher in the hierarchy, each of the additional polygon layers including successively larger polygons that each include multiple polygons from a next lower polygon layer in the hierarchy, and associating an approximate actual travel distance with each of the polygons of the additional polygon layers based on the approximate actual travel distances of at least some of the multiple polygons from the next lower polygon layer that are included in the polygon; and for each of multiple search requests for points of interest in the geographic area that are within an indicated distance from an indicated origination point, automatically using the hierarchy of polygon layers to identify a search area for the search request that approximates a subset of the geographic area within the indicated distance of the indicated origination point, the identified search area being one or more polygons from at least one of the polygon layers of the hierarchy that are selected based at least in part on the approximate actual travel distances associated with the selected one or more polygons; and providing search results for the search request by identifying points of interest that are present in the one or more selected polygons.

2. The method of claim 1 wherein the using of the hierarchy of polygon layers for a search request includes:

determining a polygon of the first polygon layer that includes the origination point for the search request;

determining a lowest polygon layer in the hierarchy that has a single polygon that includes the determined first polygon layer polygon and that has an associated approximate actual travel distance of at least the indicated distance for the search request; and selecting the single polygon of the determined lowest polygon layer as the one or more polygons that are the identified search area for the search request, such that the identified points of interest are present in the selected single polygon.

3. The method of claim 1 wherein the obtained map information includes information about travel routes in the geographic area over which an indicated type of travel is possible, and wherein the determining of the polygon-based information that represents actual travel distances in the geographic area is based at least in part on the travel routes information, such that the one or polygons selected for the identified search area for a search request have associated approximate actual travel distances that are based on the travel routes information.

4. The method of claim 3 wherein the decomposing of the geographic area into the plurality of smaller areas includes automatically generating the plurality of polygons of the first polygon layer and determining travel connectivity information for the polygons of the first polygon layer based at least in part on the travel routes information, the travel connectivity for the polygons of the first polygon layer indicating whether travel of the indicated type is possible between each pair of adjacent polygons of the first polygon layer so as to allow travel of the indicated type to pass directly from one of the polygons of the pair to the other polygon of the pair, and wherein the automatic generating of the hierarchy of polygon layers includes automatically generating the successively larger polygons of each additional polygon layer based at least in part on the determined travel connectivity information for the polygons of the first polygon layer, such that each of the successively larger polygons of the additional polygon layers does not include a pair of polygons of the next lower polygon layer if travel of the indicated type is not possible between that pair of polygons.

5. A computer-implemented method for determining location-related information for points of interest, the method comprising:
  determining information about subareas of a geographic area, the subareas represented using a hierarchy of polygon layers, the hierarchy including a lowest first polygon layer with a plurality of non-overlapping adjacent polygons, the hierarchy further including one or more successively higher additional polygon layers that each have a plurality of polygons larger than the polygons of a next lower polygon layer of the hierarchy, the polygons of the additional polygon layers each including multiple polygons from the next lower polygon layer;
  associating an approximate average distance in the geographic area with each of the polygons of the first polygon layer based on an average size of the polygon, and associating an approximate average distance in the geographic area with each of the polygons of the additional polygon layers based on the approximate average distances of at least some of the multiple polygons from the next lower polygon layer that are included in the polygon;
  automatically determining information about distance in the geographic area based on the hierarchy of polygon layers, by:
    determining one or more polygons of one or more polygon layers of the hierarchy that include at least one of first and second points of interest; and
    determining an approximate actual distance between the first and second points based at least in part on the average distances associated with the determined polygons; and
  providing an indication of the determined approximate actual distance to reflect actual travel between the first and second points.

6. The method of claim 5 wherein the automatic determining of the information about distance in the geographic area is performed in response to a request for search results within an indicated distance of a starting point of interest, the starting point being the first point of interest, wherein the determined one or more polygons include the first point of interest, wherein the method further comprises identifying the requested search results based on one or more points of interest identified within one or more subareas of the geographic area to which the determined one or more polygons correspond, the one or more identified points of interest including the second point of interest, and wherein the providing of the indication of the determined approximate actual distance includes providing information about the search results that includes the determined approximate actual distance between the first and second points.

7. The method of claim 6 wherein the determined one or more polygons are a single polygon of one of the polygon layers that includes the starting point of interest and that has an associated average distance that exceeds the indicated distance, and wherein the determined approximate actual distance between the first and second points is based at least in part on the associated average distance of the single polygon.

8. The method of claim 6 wherein the determined one or more polygons are at a highest of the polygon layers having a single polygon that includes the starting point of interest and that has an associated average distance smaller than the indicated distance, the determined one or more polygons being the single polygon, and wherein the determined approximate actual distance between the first and second points is based at least in part on the associated average distance of the single polygon.

9. The method of claim 6 wherein the determined one or more polygons include multiple polygons such that one of the multiple polygons includes the starting point of interest and such that another of the multiple polygons includes the second point of interest, and wherein the determined approximate actual distance between the first and second points is based at least in part on a combination of the associated average distances for at least some of the multiple polygons, the at least some polygons including the one polygon and the another polygon.

10. The method of claim 5 wherein the automatic determining of the information about distance in the geographic area is performed in response to a request for information about travel distance from a starting point of interest to a destination point of interest, the starting point of interest being the first point of interest and the destination point of interest being the second point of interest, wherein the determined one or more polygons are a single polygon of one of the polygon layers that includes the starting point of interest and that includes the destination point of interest, and wherein the determined approximate actual distance between the first and second points is based at least in part on the associated average distance of the single polygon.

11. The method of claim 5 wherein the automatic determining of the information about distance in the geographic area is performed in response to a request for information about travel distance from a starting point of interest to a destination point of interest, the starting point of interest being the first point of interest and the destination point of interest being the second point of interest, wherein the determined one or more polygons include multiple polygons that represent a route from the starting point of interest to the destination point of interest such that one of the multiple polygons includes the starting point of interest and such that another of the multiple polygons includes the destination point of interest, and wherein the determined approximate actual distance between the first and second points is based at least in part on a combination of the associated average distances for at least some of the multiple polygons, the at least some polygons including the one polygon and the another polygon 12. The method of claim 5 wherein the determining of the information about the subareas includes automatically generating the polygons of the additional polygon layers, and wherein the associating of the approximate average distance with each of the polygons of the additional polygon layers is performed automatically.

13. The method of claim 12 wherein the determining of the information about the subareas further includes automatically generating the polygons of the first polygon layer, and wherein the associating of the approximate average distance with each of the polygons of the first polygon layer is performed automatically.

14. The method of claim 5 wherein the polygons of the first polygon layer are at least one of a substantially similar size and of a substantially similar shape.

15. The method of claim 5 wherein the polygons of the first polygon layer are constructed such that the associated average distances for the polygons of the first polygon layer are substantially equal.

16. The method of claim 5 wherein the polygons of the first polygon layer are constructed so as to represent existing travel routes in the geographic area using one or more types of travel, such that the determined approximate actual distance to reflect actual travel between the first and second points is based on travel of at least one of the one or more travel types.

17. The method of claim 5 further comprising associating travel connectivity information with each of at least some of the polygons of the first polygon layer, the travel connectivity information representing whether direct travel of an indicated type is possible between at least some pairs of adjacent polygons of the first polygon layer, and wherein the polygons of one or more of the additional polygon layers are constructed so as to reflect the travel connectivity information associated with the at least some polygons of the first polygon layer, such that the determined approximate actual distance between the first and second points is based at least in part on the travel connectivity information associated with the at least some polygons of the first polygon layer.

18. The method of claim 5 wherein the determining of the information about the subareas and the automatic determining of the information about distance is the geographic area are performed in response to a request for the determined information about the distance.

19. The method of claim 5 wherein the determining of the information about the subareas and the associating of the approximate average distance in the geographic area for each of the polygons of the first polygon layer and of the additional polygon layers is performed prior to a request for determined information about the distance, and wherein the automatically determining of the information about distance in the geographic area and the providing of the indication of the determined approximate actual distance are performed in response to each of multiple requests.

20. The method of claim 5 wherein each of the polygons of the first polygon layer represents a distinct subarea of the geographic area, wherein each of the polygons of the additional polygon layers represents a larger subarea of the geographic area than the polygons of the next lower polygon layer of the hierarchy, and wherein the average distances associated with each of the polygons represent an actual travel distance through the subarea that the polygon represents, such that the indicated determined approximate actual distance between the first and second points represents an approximate distance of actual travel between the first and second points.

21. The method of claim 20 wherein the determining of the approximate actual distance between the first and second points further includes determining an approximate actual travel time for travel between the first and second points based at least in part on the hierarchy of polygon layers, and wherein the providing of the indication of the determined approximate actual distance includes providing an indication of the determined approximate actual travel time.

22. The method of claim 21 wherein the determining of the approximate actual travel time for travel between the first and second points is further based on information about one or more current conditions that affect travel in the geographic area.

23. A non-transitory computer-readable medium whose contents enable a computing device to determine location-related information of interest, by performing a method comprising:
   obtaining information about a geographic area, the obtained information including at least a first polygon layer with a plurality of polygons such that each of the polygons represents a subarea of the geographic area, each of the polygons of the first polygon layer having an associated value for a measurement of travel through the subarea that corresponds to the polygon;
   automatically determining approximate travel information for the geographic area based on the plurality of polygons, by:
     determining one or more of the polygons that include at least one of multiple locations of interest; and
     determining an approximate value of a measurement of travel between at least two of the multiple locations based at least in part on the associated travel measurement values for at least one of the determined polygons; and
   providing an indication of the determined approximate travel measurement value to reflect approximate actual travel between the at least two locations.

24. The computer-readable medium of claim 23 wherein the polygons of the first polygon layer are non-overlapping and adjacent so as to represent a plurality of subareas of the geographic area, wherein the obtained information further includes a hierarchy of multiple polygon layers that include the first polygon layer as a lowest polygon layer of the hierarchy and further include one or more successively higher additional polygon layers that each have a plurality of polygons larger than the polygons of a next lower polygon layer of the hierarchy, the polygons of the additional polygon layers each including multiple polygons from the next lower polygon layer, wherein the measurement of travel is an approximate actual average travel distance such that each of the polygons of the first polygon layer has an associated approximate actual average travel distance for the geographic area that is based on an average size of the polygon and such that each of the polygons of the additional polygon layers has an associated approximate average travel distance based on the approximate average travel distances of at least some of the multiple polygons from the next lower polygon layer that are included in the polygon, and wherein the determined approximate travel measurement value is a determined approximate actual travel distance between the at least two locations.

25. The computer-readable medium of claim 24 wherein the at least two of the multiple locations include a first location of a first point of interest and a second location of a second point of interest, wherein the at least one of the multiple locations of interest include at least one of the first and second locations, and wherein the automatic determining of the approximate travel information for the geographic area includes automatically determining information about approximate actual travel distance in the geographic area based on the hierarchy of polygon layers, such that the determining of the one or more polygons that include the at least one of multiple locations of interest includes determining one or more polygons of one or more polygon layers of the hierarchy that include at least one of the first and second points of interest.

26. The computer-readable medium of claim 23 wherein the obtained information further includes a hierarchy of multiple polygon layers that include the first polygon layer as a lowest polygon layer of the hierarchy and further include one or more successively higher additional polygon layers that each have a plurality of polygons larger than the polygons of a next lower polygon layer of the hierarchy so as to each represent a larger subarea of the geographic area than the polygons of the next lower polygon layer of the hierarchy.

27. The computer-readable medium of claim 26 wherein the measurement of travel is travel distance such that each of the polygons of the first and additional polygon layers has an associated travel distance for the subarea of the geographic area that the polygon represents, wherein the automatic determining of the approximate travel information for the geographic area is performed in response to a request for search results within an indicated distance of a starting location of interest, wherein the determined one or more polygons are a single polygon of one of the polygon layers that includes the starting location of interest and that has an associated travel distance that corresponds to the indicated distance, wherein the method further comprises identifying the requested search results at one or more other locations of interest within that subarea of the geographic area that the single polygon represents, wherein the determining of the approximate value of the measurement of travel between at least two of the multiple locations includes, for each of at least one of the one or more other locations of interest, determining an approximate travel distance from the starting location of interest to the other location of interest, and wherein the providing of the indication of the determined approximate travel measurement value includes providing information about the search results that includes an identification of the at least one other locations of interest and of the determined approximate travel distance for each of the at least one other locations of interest.

28. The computer-readable medium of claim 26 wherein the measurement of travel is travel time such that each of the polygons of the first and additional polygon layers has an associated travel time for the subarea of the geographic area that the polygon represents, wherein the automatic determining of the approximate travel information for the geographic area is performed in response to a request for search results within an indicated travel time of a starting location of interest, wherein the determined one or more polygons are a single polygon of one of the polygon layers that includes the starting location of interest and that has an associated travel time that corresponds to the indicated travel time, wherein the method further comprises identifying the requested search results at one or more other locations of interest within the subarea of the geographic area that the single polygon represents, wherein the determining of the approximate value of the measurement of travel between at least two of the multiple locations includes, for each of at least one of the one or more other locations of interest, determining an approximate travel time from the starting location of interest to the other location of interest, and wherein the providing of the indication of the determined approximate travel measurement value includes providing information about the search results that includes an identification of the at least one other locations of interest and of the determined approximate travel time for each of the at least one other locations of interest.

29. The computer-readable medium of claim 26 wherein the measurement of travel is travel time such that each of the polygons of the first and additional polygon layers has an associated travel time for the subarea of the geographic area that the polygon represents, wherein the automatic determining of the approximate travel information for the geographic area is performed in response to a request for information about travel time from a starting location of interest to a destination location of interest, wherein the determined one or more polygons are a single polygon of one of the polygon layers that includes the starting location of interest and that includes the destination location of interest, wherein the determining of the approximate value of the measurement of travel between at least two of the multiple locations includes determining an approximate travel time from the starting location of interest to the destination location of interest based on the associated travel time for the single polygon, and wherein the providing of the indication of the determined approximate travel measurement value includes providing information about the determined approximate travel time.

30. The computer-readable medium of claim 23 wherein the measurement of travel is travel time such that each of the polygons of the first polygon layer has an associated travel time for the subarea of the geographic area that the polygon represents, wherein the automatic determining of the approximate travel information for the geographic area is performed in response to a request for information about travel time from a starting location of interest to a destination location of interest, wherein the determined one or more polygons include a sequence of multiple connecting polygons from a first polygon that includes the starting location of interest to a last polygon that includes the destination location of interest, wherein the determining of the approximate value of the measurement of travel between at least two of the multiple locations includes determining an approximate travel time from the starting location of interest to the destination location of interest based at least in part on the associated travel times for the multiple polygons of the sequence, and wherein the providing of the indication of the determined approximate travel measurement value includes providing information about the determined approximate travel time.

31. The computer-readable medium of claim 23 wherein the plurality of polygons are constructed such that the associated travel measurement values for the polygons are substantially equal.

32. The computer-readable medium of claim 23 wherein the contents are instructions that when executed cause the computing device to perform the method.

33. The computer-readable medium of claim 23 wherein the contents include one or more data structures for use in determining the location-related information of interest, the data structures comprising multiple entries, each entry corresponding to one of multiple polygon layers of a hierarchy and containing information about a plurality of polygons of the polygon layer that each represent a distinct subarea of the geographic area.

34. A computing system configured to determine location-related information of interest, comprising:
    one or more memories; and
    a location-based information provider system that is configured to determine location-related information of interest, by:

obtaining information about a plurality of polygons that each represent a distinct subarea of a geographic area, the plurality of polygons being part of a hierarchy of polygon layers that includes a lowest first polygon layer with multiple of the plurality of polygons and that further includes one or more successively higher additional polygon layers that each have multiple of the plurality of polygons that are larger than the polygons of a next lower polygon layer of the hierarchy, the polygons of the additional polygon layers each including one or more polygons from the next lower polygon layer, each of the polygons of the first polygon layer having an associated average distance to reflect actual travel of one or more travel types through the subarea that the polygon represents, and each of the polygons of the additional polygon layers having an associated average distance based at least in part on the average distances of at least some of the one or more polygons from the next lower polygon layer that are included in the polygon;

determining one or more polygons of one or more polygon layers of the hierarchy that include at least one of multiple locations of interest;

determining an actual distance between at least two of the multiple locations based at least in part on the average distances associated with the determined polygons; and providing an indication of the determined actual distance to reflect actual travel between the at least two locations.

35. The computing system of claim 34 wherein the location-based information provider system includes software instructions for execution in memory of the computing system.

36. The computing system of claim 34 wherein the location-based information provider system consists of a means for determining location-related information of interest, by:

obtaining information about a plurality of polygons that each represent a distinct subarea of a geographic area, the plurality of polygons being part of a hierarchy of polygon layers that includes a lowest first polygon layer with multiple of the plurality of polygons and that further includes one or more successively higher additional polygon layers that each have multiple of the plurality of polygons that are larger than the polygons of a next lower polygon layer of the hierarchy, the polygons of the additional polygon layers each including one or more polygons from the next lower polygon layer, each of the polygons of the first polygon layer having an associated average distance to reflect actual travel of one or more travel types through the subarea that the polygon represents, and each of the polygons of the additional polygon layers having an associated average distance based at least in part on the average distances of at least some of the one or more polygons from the next lower polygon layer that are included in the polygon;

determining one or more polygons of one or more polygon layers of the hierarchy that include at least one of multiple locations of interest;

determining an actual distance between at least two of the multiple locations based at least in part on the average distances associated with the determined polygons; and providing an indication of the determined actual distance to reflect actual travel between the at least two locations.

\* \* \* \* \*

UNITED STATES PATENT AND TRADEMARK OFFICE
CERTIFICATE OF CORRECTION

PATENT NO.         : 7,953,548 B2
APPLICATION NO.    : 12/082836
DATED              : May 31, 2011
INVENTOR(S)        : Darren E. Vengroff et al.

It is certified that error appears in the above-identified patent and that said Letters Patent is hereby corrected as shown below:

Item 56:
"McGee, Matt, "10 Likely Elements of Google's Local Search Algorithm," retrieved on April 14, 2008, from http://www.smallbusines-sem.com/10-likely-elements-of-googles-local-search-algorithm/519/, 12 pages." should read, --McGee, Matt, "10 Likely Elements of Google's Local Search Algorithm," retrieved on April 14, 2008, from http://www.smallbusinessem.com/10-likely-elements-of-googles-local-search-algorithm/519/, 12 pages.--.

Item 56:
""Florist in Seattle-YELLOWPAGES.COM," retrieved on April 14, 2008, from http ://www.yellowpages.com/Seattle-WA/Florists-?search_mode=all&address=700+Fifth+Avenue..., 4 pages." should read, --"Florist in Seattle-YELLOWPAGES.COM," retrieved on April 14, 2008, from http://www.yellowpages.com/Seattle-WA/Florists?search_mode=all&address=700+Fifth+Avenue..., 4 pages.--.

Item 56:
""Map of florist in Seattle-YELLOWPAGES.COM," retrieved on April 14, 2008, from http ://www.yellowpages. com/Seattle-WA/Flo-rists/city-Seattle?address=700+Fifth+Avenue%C+..., 1 page." should read, --"Map of florist in Seattle-YELLOWPAGES.COM," retrieved on April 14, 2008, from http://www.yellowpages.com/Seattle-WA/Florists/city-Seattle?address=700+Fifth+Avenue%C+..., 1 page.--.

Signed and Sealed this
Thirty-first Day of July, 2012

David J. Kappos
*Director of the United States Patent and Trademark Office*